United States Patent
Fukuzaki

Patent Number: 5,948,103
Date of Patent: Sep. 7, 1999

[54] ELECTRONIC DOCUMENT SECURITY SYSTEM, AFFIXED ELECTRONIC SEAL SECURITY SYSTEM AND ELECTRONIC SIGNATURE SECURITY SYSTEM

[75] Inventor: Yasuhiro Fukuzaki, Saitama-ken, Japan

[73] Assignee: Wacom Co., Ltd., Japan

[21] Appl. No.: 08/806,164

[22] Filed: Feb. 25, 1997

[30] Foreign Application Priority Data

Jun. 26, 1996 [JP] Japan ................... 8-185484

[51] Int. Cl.⁶ .................................... H04K 1/00
[52] U.S. Cl. ............................. 713/200; 380/25
[58] Field of Search ............... 395/186; 380/3, 380/4, 23, 25, 43; 713/200

[56] References Cited

U.S. PATENT DOCUMENTS

| | | | |
|---|---|---|---|
| 5,031,214 | 7/1991 | Dziewit et al. | 380/23 |
| 5,606,609 | 2/1997 | Houser et al. | 380/4 |
| 5,689,567 | 11/1997 | Miyauchi | 380/25 |
| 5,706,427 | 1/1998 | Tabuki | 713/201 |
| 5,719,940 | 2/1998 | Ahn et al. | 380/25 |

FOREIGN PATENT DOCUMENTS

| | | |
|---|---|---|
| A 2-134940 | 5/1990 | Japan . |
| A 3-67356 | 3/1991 | Japan . |
| A 3-189716 | 8/1991 | Japan . |
| A 3-195229 | 8/1991 | Japan . |
| A 4-11877 | 1/1992 | Japan . |
| A 4-91531 | 3/1992 | Japan . |
| A 4-160493 | 6/1992 | Japan . |
| A 5-260043 | 10/1993 | Japan . |
| 6-20199 | 3/1994 | Japan . |
| A 6-103425 | 4/1994 | Japan . |
| A 6-103426 | 4/1994 | Japan . |
| A 6-95591 | 4/1994 | Japan . |
| A 6-150082 | 5/1994 | Japan . |
| A 6-161354 | 6/1994 | Japan . |
| A 6-162289 | 6/1994 | Japan . |
| A 6-224896 | 8/1994 | Japan . |
| A 6-315036 | 11/1994 | Japan . |
| A 7-135680 | 5/1995 | Japan . |
| A 7-162451 | 6/1995 | Japan . |
| A 7-200137 | 8/1995 | Japan . |
| A 8-16311 | 1/1996 | Japan . |

OTHER PUBLICATIONS

Rivest, Ronald L., "The MD5 Message–Digest Algorithm," MIT Laboratory for Computer Science and RSA Data Security, Inc., Apr. 1992.

*Primary Examiner*—Glenn A. Auve
*Attorney, Agent, or Firm*—Finnegan, Henderson, Farabow, Garrett & Dunner, L.L.P.

[57] ABSTRACT

An electronic document security system, a fixed electronic seal security system, and an electronic signature security system. A method for security coding a document uses a symbolic figure such as a signature or a seal. An electronic document including a symbolic figure is stored. The electronic document is encoded in accordance with a confidential key and a predetermined characteristic is extracted from the encoded electronic document. The symbolic figure is then modified in accordance with the characteristic. The confidential key and the symbolic figure may be stored in a portable media to increase the security.

52 Claims, 10 Drawing Sheets

FIG. 2A
稟議書
新製品の製品化を提案します。
この製品で新しい市場を開拓します。
御決済をお願いします。
FIG. 2B
| 226 | 103 | 139 | 99  | 143 | 145 | 13  | 10  | 144 | 86  |
|-----|-----|-----|-----|-----|-----|-----|-----|-----|-----|
| 144 | 187 | 149 | 105 | 130 | 204 | 143 | 164 | 149 | 105 |
| 137 | 187 | 130 | 240 | 146 | 241 | 136 | 196 | 130 | 181 |
| 130 | 220 | 130 | 183 | 129 | 66  | 13  | 10  | 130 | 177 |
| 130 | 204 | 144 | 187 | 149 | 105 | 130 | 197 | 144 | 86  |
| 130 | 181 | 130 | 162 | 142 | 115 | 143 | 234 | 130 | 240 |
| 138 | 74  | 145 | 241 | 130 | 181 | 130 | 220 | 130 | 183 |
| 129 | 66  | 13  | 10  | 140 | 228 | 140 | 136 | 141 | 207 |
| 130 | 240 | 130 | 168 | 138 | 232 | 130 | 132 | 130 | 181 |
| 130 | 220 | 130 | 183 | 129 | 66  |     |     |     |     |
FIG. 2C
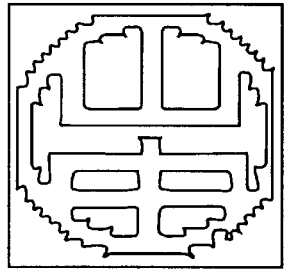
FIG. 2D
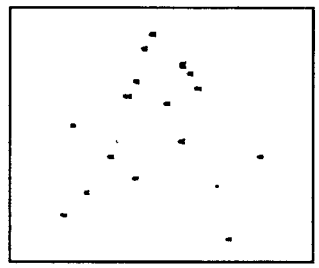
FIG. 2E
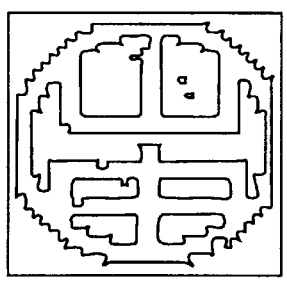
FIG. 2F
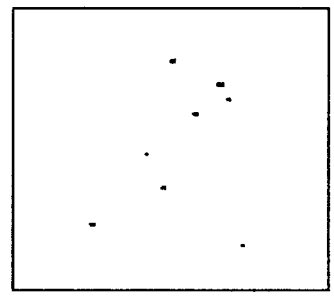
FIG. 2G
稟議書
新製品の製品化を提案します。
この製品で新しい市場を開拓します。
御決済をお願いします。

FIG. 3A
This is the very important document.
Never change this text.
FIG. 3B
84 104 105 115  32 105 115  32 116 104
101  32 118 101 114 121  32 105 109 112
111 114 116  97 110 116  32 100 111  99
117 109 101 110 116  46  13  10  78 101
118 101 114  32  99 104  97 110 103 101
 32 116 104 115  32 116 101 120 116  46
FIG. 3C
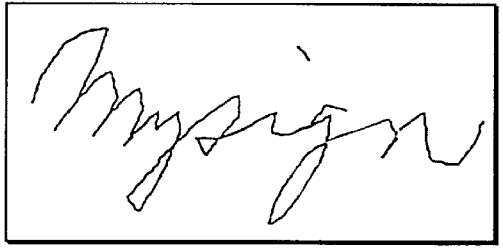
FIG. 3D
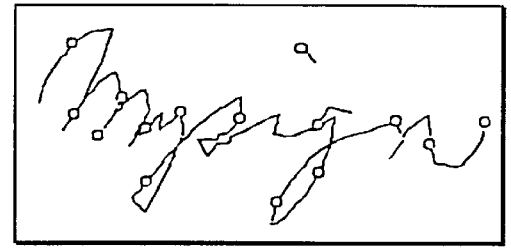
FIG. 3E
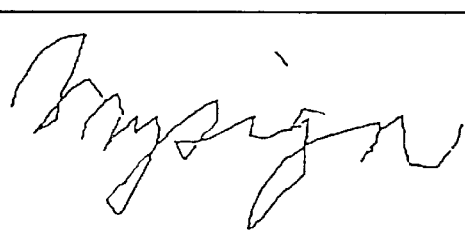
FIG. 3F
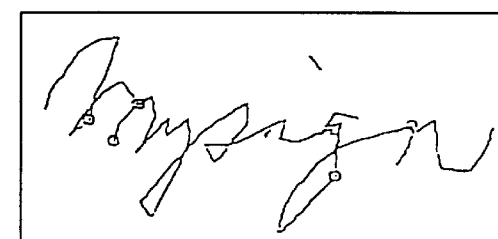
FIG. 3G
This is the very important document.
Never change this text.
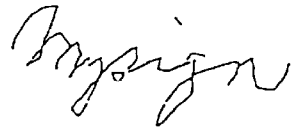

FIG. 11A
PRIOR ART

This is the very important document.
No one can change this text.

FIG. 11B
PRIOR ART

-----BEGIN PGP SIGNED MESSAGE-----
THIS IS THE VERY IMPORTANT DOCUMENT.
NO ONE CAN CHANGE THIS TEXT
-----BEGIN PGP SIGNATURE-----
VERSION:2.6.2i iQB1AwUBMTwdb8HzgKtU1kkVAQHOVAL/Xfz1ATh98ast19h3qxBQErg13G5SgmE3
cxPDuqqN1YVQjStUiYQn5DZY4M÷NXZYsgSjy2JEWZpH÷8aJRGtJYDtGFVBEw/Ja6
dUo/IY5r8FOBYMX5uGd5dq82xrRMGWwN
=N6kh
-----END PGP SIGNATURE-----

FIG. 11C
PRIOR ART

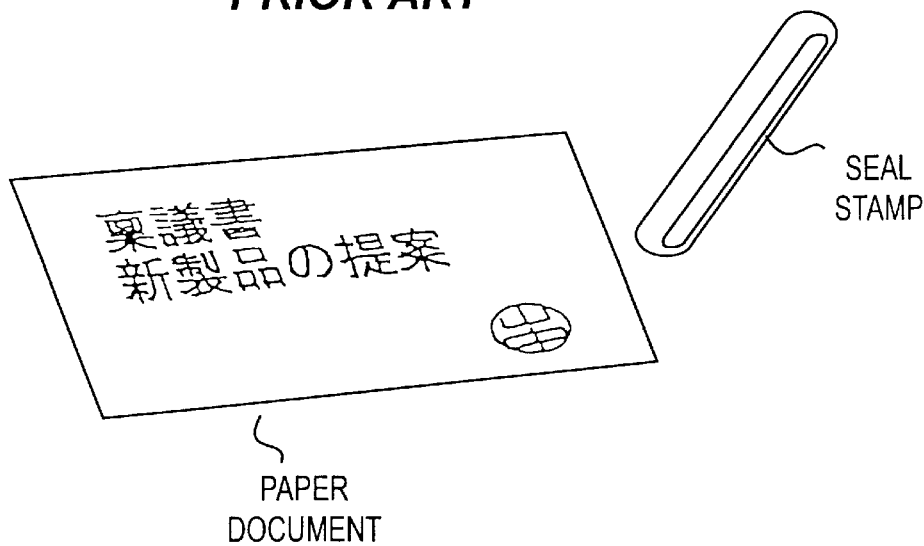

SEAL STAMP

PAPER DOCUMENT

1

ELECTRONIC DOCUMENT SECURITY SYSTEM, AFFIXED ELECTRONIC SEAL SECURITY SYSTEM AND ELECTRONIC SIGNATURE SECURITY SYSTEM

BACKGROUND OF THE INVENTION

1. Field of the Invention

The present invention relates to security technology for electronic documents.

2. Description of the Related Art

Electronic transaction of documents is increasing in companies as LAN have been widely installed. There is a difficulty to execute a settlement or approval for those documents through electronic means.

It is Japan's custom to make settlement by affixing a seal on a hard copy document, while in Europe signature takes the position of the seal. It is very easy to accomplish an effect of the seal and signature on a computer, but it imposes a problem of an easy access to copy or tamper such electronic information which then becomes a security issue.

To cope with such a problem, encoding technology has been commonly used. Especially a public key encoding method has been developed recently (Japanese Patent Publication No. 6-20199, Japanese Patent Laid Open Nos. 2-134940, 3-67356, 3-195229, 4-91531, 4-11877, 4-160493, 5-260043, 6-95591, 6-103425, 6-103426, 6-150082, 6-161354, 6-162289, 6-224896, 6-315036, 7-135680, 7-162451).

The common key encoding method, used in the prior art, discloses one key, thereby enabling the sender and receiver of information to be identified respectively. The purpose of this method is to guarantee that a document is neither created by someone else, nor tampered with. The document encoded with a confidential key is made public, thereby accomplishing the purpose of a regular signature. This is called a digital signature, or electronic signature.

If a document is encoded, then the content cannot be read as plain sentences. Therefore, if the purpose is to prevent tampering, and no need to keep content itself confidential, then the encoded characters are added to the original document. We may call this a clear signature.

The disclosed key encoding method is known as a time consuming process which requires a high processing capability, and takes more time than prior encoding methods. In order to overcome such problems, instead of encoding the whole document directly, a method of extracting characteristic data from a document and encoding the data is being used. This extracted characteristic data is called an electronic fingerprint; in case the original information is different even by 1 bit, then an unpredictable totally different data will be output.

In this method, a one-way hush function is adopted, and in fact programs such as MD2, MD4, MD5 of RSA Data Security, Inc. U.S.A. are disclosed. A disclosed document about the program for extracting characteristic data by RSA Data Security, Inc. is "the MD5 Message-Digest Algorithm" (Ronald Divest, REC 1321 MIT Laboratory for Computer Science, 1991.) This document is disclosed by RSA Data Security, Inc. through the Internet.

The program converts variable-length original data into 128 bits fixed-length characteristics data. MD2 and MD5 are used in PGP which is a disclosed key encoding communication software, and PEM which is a standard encoded electronic mail.

FIG. 11 is a diagram of an electronic signature (clear signature) in the prior art. FIG. 11(A) is a document which requires a signature. FIG. 11(B) is a document with plain sentences followed by an electronic signature (digital signature). This electronic signature is created by encoding the document through a use of the sender's confidential key. The receiver then decodes the signature with the disclosed key to plain sentences. If the two plain sentences are identical, then the electronic document is verified as authentic.

Among methods of getting characteristics data other than the disclosed key encoding method, there is a check sum method. This method takes every datum as a numeric value regardless of the datum being a character code or not, and adds up the numeric values, then the total sum becomes the characteristics data. This method enables you to get the characteristics data rather easily, but its security function is vulnerable.

Additional sentences as a clear signature becomes an enumeration of meaningless letters, which may be an eyesore. Also, the confidential key data which is used to create the clear signature is usually built into the device, so that the security for the confidential key becomes a serious issue.

For a hard copy document, a seal or signature as shown in FIG. 11(c) have been used widely. If a figure attached to the document has a shape like a seal or a signature, then it looks more natural, and makes it possible for a person to judge the authenticity to a certain degree.

SUMMARY OF THE INVENTION

It is the purpose of the present invention that by adding information such as a seal or a signature, enabling a person's eyes to make the judgment on the authenticity of the document to a certain degree, and makes it possible to conduct a precise verification by modifying the seal or the signature with characteristic data of the document.

If a figure is drawn by an assembly of two dimension dots, i.e. bitmap, characteristic data information can be reflected in the figure by modifying a part or a whole of the dots.

If a figure comprises position and size of figure elements such as a line, a circle or a rectangular, i.e. vector information, then the characteristics quantities of the document can be reflected in the position or the size of the figure elements.

Once the document is kept in this form, when a need arises to verify the authenticity of the document, that the document is neither copied nor changed, the characteristics quantities which the document is supposed to have may be extracted from the figure data, modified by the characteristic quantities of the document, and compared to the characteristic quantities of the document itself.

A document mentioned here is not limited to information composed of letters. Information can be a drawing, audio, multimedia such as animation, or a hyper text which includes reference information to other documents.

As an example for increasing the security, a document which includes a sign or a signature used by a lower manager with a security function can be regarded as a main body of the document, and then an upper manager may add a seal or a signature in accordance with the present invention.

The characteristic quantities mentioned here refer to the data extracted through the above mentioned electronic fingerprint data method or check sum method. A powerful security can be accomplished by encoding the characteristic quantities with the confidential key in the disclosed key encoding method, and modifying the figure with the data after encoding.

Even without the encoding step, by just modifying the figure with the characteristics quantities, a simple copying of a figure can be prevented. In other words, almost anyone can make a copy of a figure data easily on a computer system, but such a problem can be effectively prevented by this means.

Moreover, a forgery of a document becomes difficult by changing reflecting points or reflecting method to reflect characteristic data into a modified figure data. This operation is named here as a disturbance processing, and the data for the disturbance is called the disturbance data. In other words, this method means that original data needs to be fixed to a certain degree to maintain a visual recognition, so that the data is fixed and disclosed, but a disturbance data is kept separately to disturb the document in order to increase the security.

The disturbance mentioned here may be regarded as a kind of encoding. In this case, the disturbance data becomes an encoding key data. In this system, however, information to determine how and what points of a figure data will be modified is required to limit the modification in order to maintain the visual identification.

If a high security level is guaranteed by a full fledged security means such as the disclosed key encoding method, then information which is to limit points for modification for the visual identification, can be incorporated in the original figure data itself. One example is to change the color of the points in advance which will be changed by bitmap.

If a seal is to be used, then a means to affix the seal is preferred to have an actual seal stamp figure. In reality, if a position pointing device which comes in a seal stamp shape (electronic seal) for a position detecting apparatus, which is called a tablet, then a close feeling to using an actual seal stamp shall be attained.

By loading the seal data or disturbance data mentioned previously into the electronic stamp, then it becomes the electronic seal stamp system with security function.

If a signature is to be used, the means for signing a signature is a pen. It is possible to use a pen on the tablet by electronizing the pen (electronic pen).

However, if a signature is inputted by hand writing each time, it does not fit with the theme of the present invention. If a signature is different each time it is signed, then it cannot be processed as the standard figure data.

It is insufficient that the signature is signed with the same writing characteristics whenever and wherever the signature is given; the signature as the standard figure data needs to be exactly the same and electronically speaking, the electronic data which make up the figure need to be completely identical. Therefore, the data collected when a signature was given on a tablet at a certain place and time will be used thereafter. This means, a document is not actually signed each time; instead the signature data is stored in the electronic pen from which the data is transferred to the computer.

In case an available computer at a spot is used to handle a process in creating a figure data to be added to a document from the original seal data, signature data or disturbance data, then those original seal data, signature data or disturbance data needs to be received by the computer. For this reason, in case a computer is used at an outside location, a possibility of the confidential data being copied and abused against the will of the user cannot be denied.

Including such a case, the safest way is to conduct a modification process of the figure data within the electronic seal stamp or the electronic pen. The electronic seal stamp or the electronic pen may receive a document data itself or the characteristics data of the document data, and send back the figure data. A hardware configuration to actualize this kind of system is, as described later, applied for a patent separately by the same applicant as the present invention.

Adopt the disclosed key encoding method to maximize the level of security available at this time. Encode a plain document data by a confidential key in the disclosed key encoding method. For a better efficiency, compress the data while keeping the characteristics intact by, for example, a hush function, and encode the compressed data. We may call the original data plain document data and the post encoded data the encoded data.

Use this encoded data to transform or revise the standard figure data, and add it to the original plain document data. Up to this point this becomes a means for an electronic seal or an electronic signature.

Next is a means for a receiver who received the plain sentence data with an affixed seal or a signature to verify the authenticity of the seal or the signature.

First, compare the added figure data to the original standard figure data and extract the encoded data. Then decode the encoded data with the disclosed key to attain the original plain sentence data. By comparing the decoded plain sentence data to the received plain sentence data the authenticity of the affixed seal or the signature can be verified.

In case a characteristics data is used for comparison, then the characteristics data extracted from the plain sentence data will be compared to the characteristics data extracted from the figure data.

It is necessary for a person who is to verify the authenticity of the sealed or signed document to have free access to the standard figure data and the disclosed key.

By keeping the confidential key data in a mobile media, the security for the confidential key is maintained easier. By having both the encoding device and confidential key data on board in the same mobile carrying device, the confidential key data will not go out of the device so that the highest level security will be accomplished.

It is possible to have an encoding device and a confidential key data on board inside a position pointing device, and conduct a data communication for a sealing/signing operation while instructing a position to seal/sign with the position detecting apparatus.

Quantity of encoded data becomes more than 1 K bits even if a sentence is short (around 50 letters). Size of a seal image is 64 by 64 matrix of bits, which makes 4 K bits. This means one out of four dots may reflect the encoded data. If the reflection collapses the seal image and makes it difficult for human eyes to identify the image, color data for each dot can be used.

For example, current Windows (Trademark of Microsoft) enables to use 256 colors. If each color has 8 bits information, the 64 dots square seal image mentioned above will have 32 K bits data, which makes it identifiable to human eyes even after reflecting 1 K bits information. In case the original document is long, instead of encoding the whole document, you may add a short summary of the document and encode it.

In case of a signature, supposing the number of points for vector data composing the signature are 500, and each point is movable with plus or minus 3 dots in both X and Y directions, that is 7×7=49 points which is about 5.5 bits of information. With 500 points, 2750 bits can be expressed so that the 1 K bits modification information can be reflected.

Here, a rough estimate of data quantity is shown without using the characteristic extracting means such as the aforementioned MD2, MD4 and MD5. If said characteristic extracting means is used, then any size large data can be converted to 128 bit characteristic data, thus making no limit for the data quantity to be handled, leaving it only to the issue of CPU processing speed.

It is possible to configure a system for electronic verification by using a system wherein an inputting surface and a display surface are in one component, i.e. the position detecting apparatus and the display device are layered in the same component, and a seal image is displayed on the screen when the position pointing device which comes in a shape of a seal stamp, having the encoded data of the document reflected in a slightly blurred seal image.

BRIEF DESCRIPTION OF THE DRAWINGS

FIGS. 2(a)–2(g) show how the document approval and the verification of approval are conducted when the document is written in Japanese, and a figure data is bit map data;

FIGS. 3(a)–3(g) show how the document approval, verification of approval are conducted when the document is written in English, and a figure data is vector data;

FIGS. 11(a)–11(c) show an example of an electronic signature according to the prior art.

DESCRIPTION OF THE PREFERRED EMBODIMENT

Reference will now be made in detail to the present preferred embodiments of the invention, examples of which are illustrated in the accompanying drawings.

Figure 1:
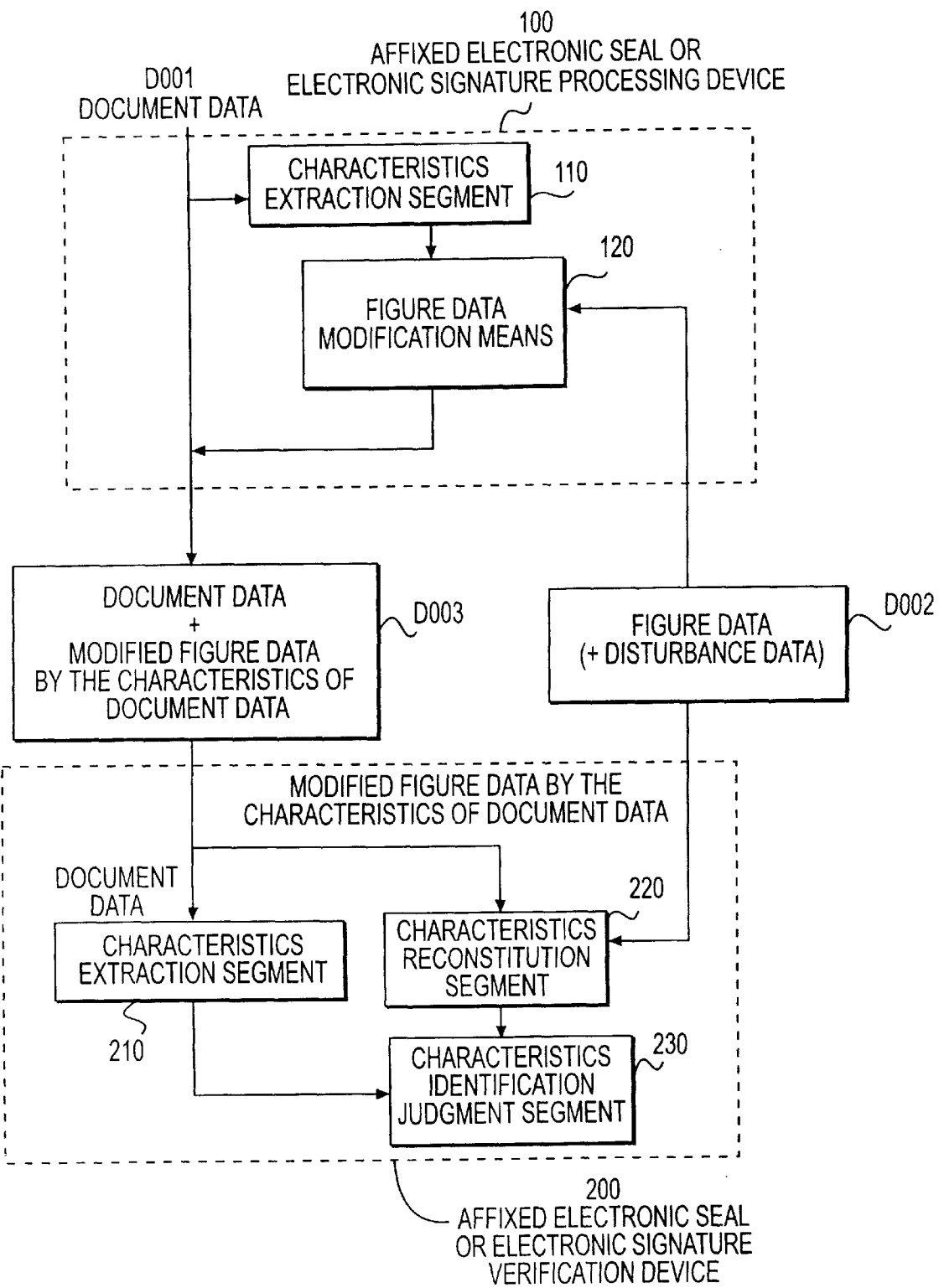
FIG. 1 is a block diagram of a basic configuration of an embodiment of the electronic document security system, the affixed electronic seal security system and the electronic signature security system in accordance with the present invention.

FIG. 1 is a block diagram showing a fundamental configuration for an electronic document security system, an affixing electronic seal security system, or an electronic signature security system.

The present invention is applied in most cases to the data transaction between general-use computers. Each configuration segment shown in the block diagram, such as a characteristic extracting segment 110, a figure data modification means 120, a characteristic reconstitution segment 220, and characteristic identification judgment segment 230, is actualized each time a computer as an information processing device (more exactly, the central processing unit, i.e. CPU) loads the pre-stored program from the memory device and executes the program. Thus, the process is performed by software in most cases.

This does not exclude other examples of implementation for the present invention such as the use of a specialized device for word processing, a multi-function telephone device, or other types of special function communication devices. The same is applied to other block diagrams illustrated in FIGS. 6 to 10.

Two devices illustrated in FIG. 1 are bordered by boxes with dotted lines. A processing device 100 affixes an electronic seal or electronic signature, and processing device 200 verifies the affixed electronic seal or electronic signature. These two devices 100 and 200 comprise an electronic document security system, an affixing electronic seal security system, or an electronic signature security system.

Names like "affixing electronic seal processing device" or "electronic signature processing device" are given to imply that this is a device to process an approval procedure electronically while the procedure for paper document approval has been usually been affixing a seal or signature.

Upper concept which includes both "processing device for affixing electronic seal" and "processing device for electronic signature" may be called "an apparatus for electronic document approval operation." In a like manner, "processing device for verification of affixed electronic seal" and "processing device for verification of electronic signature" received their names to indicate that what human visual inspection did to verify the authenticity of a paper document with an affixed seal or a signature (verify that the document seems to be sealed or signed by an authentic person) is now processed electronically.

Upper concept which includes both a "processing device for verification of affixed electronic seal" and a "processing device for verification of electronic signature" may be called "an apparatus for verification of electronic document approval."

Two devices illustrated in FIG. 1 describes that, under normal circumstances there exists plural devices in an apparatus with a housing (one computer) wherein each device has both "approval" and "verification" functions. In operation, one device focuses on "approval", while the other device focuses on "verification."

This can be likened to the case of two transceivers wherein each transceiver has both transmission and reception functions. Though each device has both functions, in actual use, one is transmitting and the other is receiving so that one transceiver focuses on transmission while the other transceiver focuses on reception.

Therefore, the characteristic extraction segment 110 in the processing device for affixing electronic seal and electronic signature 100 and the characteristics extraction segment 210 in the verification processing device for affixing electronic seal and electronic signature have the same function, but are installed in separate information processing devices.

In other words, the characteristic extraction segment 110 in the processing device for affixing electronic seal and electronic signature 100 plays the role of the characteristics extraction segment 110 when the computer it belongs is playing a role of "approval," but has a potential to play the role of the characteristic extraction segment 210 when the computer it belongs to is in a position to engage for "verification" processing.

Concerning the security system for electronic document, affixing an electronic seal, and electronic signature which are composed of the processing device 100 for affixing an electronic seal or electronic signature and the processing device 200 verifying the affixed electronic seal or electronic signature, its composition and operation shall be described in accordance with a data processing flow.

The document data D001 is an electronic document data possible to be reproduced as an electronic document by a predetermined software. Here, the predetermined software is referred to as an application program of a computer such as word processor, spread sheet, database, CAD (computer aided design) or intra-company mail system, which can store the electronic document data securely, and which is capable of displaying the content of the document to a display device such as a CRT (cathode-ray tube), enabling an operator to see the content visually as if he is seeing a paper document.

There are several paths for the document data D001 to be delivered to the processing device 100 for affixing the electronic seal or electronic signature.

First, in case a person who created the document data D001 himself wants to approve the document by affixing the electronic seal or the electronic signature, the document data D001 is considered to have been stored in the same computer which includes the processing device 100 for the affixed electronic seal or the electronic signature. In this case, by making an access to the document, the document data D001 is handed to the processing device 100 for the affixed electronic seal or the electronic signature.

A second case is that a person who created the document data D001 is different from a person who approves the document, and the two computers they use are not connected to each other. In this case, the document is brought to the computer the approver uses via a portable information storage media such as a floppy disk, enabling the processing device 100 for the affixed electronic seal or the electronic signature to be able to access the document.

A third case is when the computer a sender who sends the document data D001 uses and the computer a person who approves the document uses are connected to a network either by LAN or by modems and telephone line. The sender can then send the document data D001 via a system like electronic mail system to the person who approves the document, and the person who approves the document will receive the document data D001 in this way.

The document data D001 which is transmitted to the processing device 100 for affixed electronic seal or electronic signature should be stored there at least temporarily (if necessary, semi permanently) so that the processing device 100 for affixed electronic seal or electronic signature will have an electronic document data storage means. To avoid complication, these different cases are not illustrated in FIG. 1.

A Japanese document shown in FIG. 2(A) or an English document (or in any language) shown in FIG. 3(A) are examples when the document data D001 shown in FIG. 1 is visually displayed on a display device to be seen by an operator. The documents, when seen as electronic data, are an enumeration of numbers which indicate character code such as FIG. 2(B) or FIG. 3(B) (FIG. 2 and FIG. 3 will be explained later).

The characteristic extracting segment 110 extracts the characteristics of the document data D001 as a document data, i.e., as an enumeration of character code numbers. The extracting of characteristics can be done, as it will be explained more in detail later with the reference to FIG. 2 and FIG. 3, for example by using a check sum method.

The characteristics of the document data D001 extracted by the characteristic extracting segment 110 will be sent to the figure data modification means 120 in order to modify the figure data with it.

The figure data modification means 120 will read the figure data D002 and make a modification in accordance with the characteristics of the document data D001. The modified figure data will be added to the document data D001 and output the data D003.

One can say that the processing device 100 for affixed electronic seal or electronic signature is a device to create D003 from the document data D001 and the figure data D002. The processing device 100 for affixed electronic seal or electronic signature includes a figure data adding means to add a modified figure data to the document data 100, but to avoid complication, a diagram to indicate such device is omitted.

The figure data D002 shown in FIG. 1 also indicates disturbance data in parentheses; the meaning of this will be explained later.

The verification processing device 200 for affixed electronic seal or electronic signature, illustrated in the lower half of FIG. 1 enclosed by a dashed line, includes the characteristic extraction segment 210, the characteristics reconstitution segment 220, and the characteristics identification judgment segment 230.

The verification processing device 200 for affixed electronic seals or electronic signature is a device to verify the authenticity of the data D003, i.e., the authenticity of the approval added to D001 by gaining two data; data D003 with a "modified figure data in accordance with the characteristics of the document data" added to the "document data."

Therefore, the procedure begins first from attaining two data; D003 and D002. In this sense, the verification processing device 200 for affixed electronic seal or electronic signature includes a data storage means for an already approved electronic document and a reference means for the standard figure data. (Since the figure data D002 is data without modification, it can be called the standard figure data. In contrast with modified figure data, D002 may be called the standard figure data when it is appropriate.)

One example of the reference method for the standard figure data is, as it will be described later, to refer the concerned data via a network server. These methods were not illustrated in FIG. 1 simply to avoid complication.

Captured D003 in the verification processing device 200 for affixed electronic seal or electronic signature will be separated from document data and a "modified figure data by the characteristics of the document data", thereby the document data will be sent to the characteristic extraction segment 210 and the "modified figure data by the characteristics of the document data" will be sent to the characteristics reconstitution segment 220.

In this sense, the verification processing device 200 for affixed electronic seal or electronic signature possesses a data separation means in itself, but this separation is to simply divide the things which are attached, which is normally a simple process.

Recent application programs such as a word processor or a mail system are very good at handling mixed data of document and figure, and these are normally capable of displaying the mixed data on a display device visually without making an operator conscious of seeing the visual image as a mixed data.

The data of D003 is an annexed data of the two data, so that the separation of the annexed data is a simple process. Therefore, the data separation means mentioned here is remote from the main portion of the present invention, and thereby omitted from FIG. 1 to avoid a complication.

The verification method for the authenticity of D003 by the verification processing device 200 for affixed electronic seal or electronic signature is to extract the characteristics of the document data by two methods, and evaluate if the two match up.

At first the characteristic extraction segment 210 extracts the characteristics of the separated document data from D003, i.e., the same document data as the original document data D001. The attained characteristics should be identical to the characteristics the processing device 100 for affixed electronic seal or electronic signature attained from the document data D001.

On the other hand, the characteristics reconstitution segment 220 reconstitutes the characteristics from the "modified figure data by the characteristics of the document data" and the "standard figure data (D002)." In order for the reconstitution to be possible, either the modification which the figure data modification means 120 in the processing device 100 for affixed electronic seal or electronic signature added is unique toward the characteristics, or always enabling to attain solutions to convert to the original characteristics from the figure data modification, the solutions being a limited number.

In case the modification is unique, the characteristics identification judgment segment 230 will compare the two characteristics to determine if they are identical exactly or not. If the modification is not unique, the authenticity of the affixed seal or signature will be verified if the characteristics are identical with one of the limited number of solutions. The quantum characteristics identification judgment which will be illustrated later in FIGS. 6 to 10 will be sufficed by this kind of match up. The processing for the unique solution is easier and more accurate than the plural solutions.

An explain with examples of document data and figure data follows with reference to FIGS. 2 and 3. FIG. 2 illustrates the processes of the document approval and the approval verification related to the present invention when the document data is a Japanese document data and a figure data is bitmap data.

FIG. 2(A) is an example of a Japanese document. FIG. 2(B) is a data attained by coding each character comprising the Japanese document according to the shift JIS code.

A Chinese character consists of a two byte code, so that the document as a whole consists of 96 bytes. The numbers for the characters data are ordinal numbers, and not numerical values, strictly speaking, but regard all of them as numeric values to be added, thereby called checksum (modulo-n check).

In this example the sum total for the document data becomes 13864 (a decimal system). This number in binary number is 0011011000101000 (a binary system). This number, for example, is considered as the characteristics of the document data.

FIG. 2(C) illustrates figure data composed of bitmaps. This is the standard figure data (D002 shown in FIG. 1). This example uses an affixed seal figure (seal image) of a stamp seal used in some countries like Japan to approve a paper document, expressed as an electronic data with bitmaps.

A signature can be expressed with bitmaps to get a standard figure data. A trademark, a logo mark, a crest, a medal, etc., can be used also in place of the standard figure data for the same purpose. The seal image to be used in this invention is not limited to a type used in Japan; a type of seal feature used in Europe or United States is also accepted.

The figure to show the seal image here is 32 dots by 32 dots to make it easy to see the effect. As shown in FIG. 2©the seal image has a Japanese sir name 山中 and as shown in FIG. 2(D) the 16 points are pre-selected as points (bits) to reflect the characteristics of the document data.

The information to indicate which points (bits) are the 16 points is included in D002 (standard figure data) illustrated in FIG. 1. In the figure data, the data to show which points reflect the characteristics used as a disturbance data will be explained later, and is shown in the parentheses in FIG. 1, D002.

We may apply a change to each of the 16 points of the standard figure data based on the 16 bit binary numbers attained through the checksum mentioned before. For example, if a bit is 1 then reverse white and black, if it is 0 then no change will be applied.

In this manner the result of adding changes to 16 points of the FIG. 2(D) out of the standard figure data FIG. 2© based on the above mentioned binary numbers "0011011000101000" is FIG. 2(E) and among 16 points, extracting points which reversed white and black has become FIG. 2(F).

The figure of FIG. 2(E) attained in this manner includes the characteristics of the document data, and yet it appears to be almost identical to the seal image to ordinary human eyes. By adding this modified figure data to the document data it became FIG. 2(G). FIG. 2(G) achieves a conventional approval procedure in some countries like Japan, which is to approve paper document by affixing a seal on it, through electronic processing.

Conversely, to gain the characteristics of the original document from this seal image you may reconstitute the characteristics by comparing to the original standard figure data (seal image data) and check the state of reflection points for the characteristics (16 points in this case).

The original standard figure data is a substitute for a seal stamp which should be strictly guarded by a responsible person, and for other people, it should be used only for extracting the characteristics in the verification process as a reference.

The management of the standard figure data can be handled, for example, by a network server. By comparing the reconstituted characteristics by the characteristics reconstitution segment 220 shown in FIG. 1 to the characteristics extracted again from the document data by the characteristics extraction segment 210 from the document data, and if both are identical then the document is confirmed free from tampering, as well as confirming that the seal image is not copied from another document.

To illustrate a method for attaining characteristics, the checksum, which is the simplest method, is explained. Even by the checksum method, it will be very hard to tamper a document into a meaningful document if the document is just text data.

You may also increase the degree of security by dividing the document into many small segments and applying the checksum to each of the segments, or by arranging the letters in 2 dimensions and applying the checksum to both horizontal and vertical directions.

If a document data includes figure data it will make the process for getting the characteristics to prevent a tampering much more complicated, which can be overcome by encoding techniques. In many cases the real important content can be described as a text data and figure data is only a supplement so that it can be omitted from the objects to get a characteristic.

In the present example, as a disturbance data, among figure data the data to show positions which will reflect the characteristics data is used. It is set as 16 bits to simplify the explanation, which can be greater number of bits.

You may add bits which change at random as a prevention means for those who try to tamper by deciphering modification means of a figure data. By integrating the disturbance data as a fixed data to the figure data modification means, then it will become invisible from outside. Thus, it can be handled as if the disturbance data does not exist.

By adding a means to change the disturbance data at certain time interval, the degree of security will be strengthened further. Also by limiting the positions to reflect the characteristics closer to the original figure data, the image will appear as a naturally faded image at some portion and it will not give an impression of containing a peculiar data. If the original data is a fine image composed with more dots, the image will become even more natural.

Here the reverse of black and white has been mentioned for the modification of the figure data, but it is also possible to use a gray-scale image by assigning halftone data. You may also assign gradations in color for the same purpose.

Next, an example of a western style signature will be illustrated.

FIG. 3 illustrates a method of document approval and approval verification in accordance with the present invention in case a document data is an English document data and a figure data is a vector data. FIG. 3(A) illustrates an example of English sentences, and FIG. 3(B) illustrates a data of character codes which compose the sentences.

When the checksum is calculated in the same way as a Japanese document, regarding all the character codes for 61 letters as numeric values and adding them up, then the sum is 5646 (decimal system) which is expressed as "0001011000001 110" by binary numbers.

The figure information of the signature shown in FIG. 3©️ is a so called vector figure data, or more exactly, an inkdata which is composed of connected line segments. This data which is composed of connected line segments is a data composed of a collection of XY coordinates of beginning points and ending points, so that there is no question to call it as a vector data, but we may also include circles, arcs and eclipses, etc., i.e. figure information handled in CAD as a part of the vector data.

As shown in FIG. 3(D) 16 points are selected from the figure data to reflect the characteristics of the document. In the same manner with the seal stamp, express the value of checksum in binary numbers and reflect the state of each bit to each point. The case here is set to move 3 points toward right when the bit is 1, and leave it the same when the bit is 0.

FIG. 3(E) illustrates the signature which reflects the characteristics of the data, and FIG. 3(F) illustrates the moved points reflecting the characteristics of the document data. Except the expression method of the characteristics it is the same as the example of the electronic seal stamp. FIGS. 3©️–3(F) look rough to illustrate the differences clearly. It is possible to make it almost identical to human eyesight by setting the point scale much smaller so that the moved point is just as much as one dot.

FIG. 3(G) illustrates an electronically expressed document and a signature attached to it. The signature data in the present invention is not a signature signed each time on a document, but the electronic data taken from one signature signed at a time which needs to be kept under a strict security by a person who approves documents. There may be an occasion for someone else to use the signature just for a reference to constitute the characteristics from a modified figure data. It should not be used for any other purpose than just for such reference if it is to be used by someone else.

Figure 4:
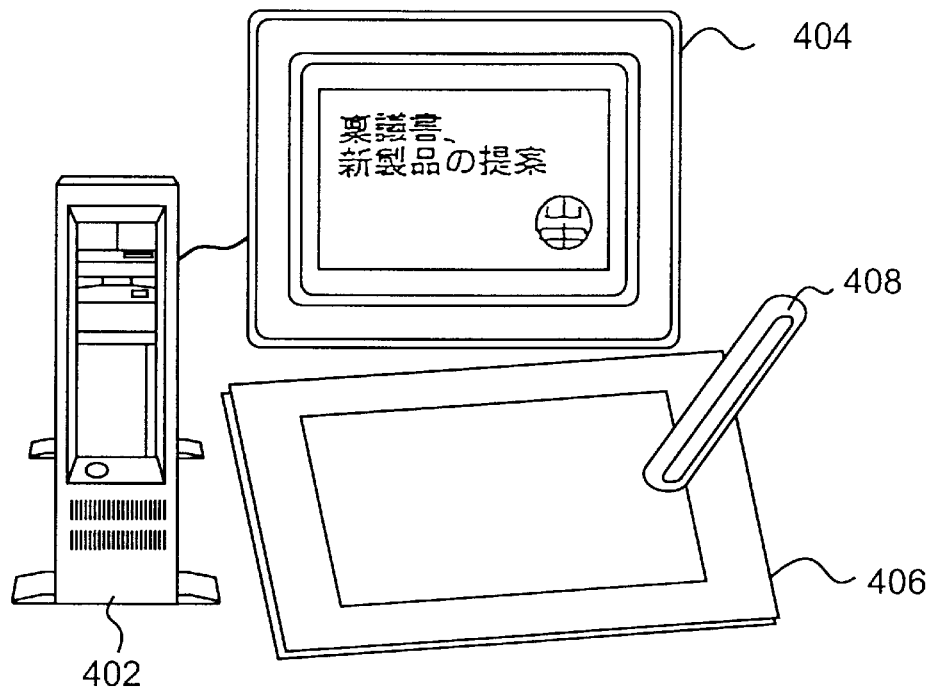
FIG. 4 shows a hardware configuration configuring the affixed electronic seal security system with a personal computer, a CRT device, a tablet and an electronic seal stamp.
Figure 5:
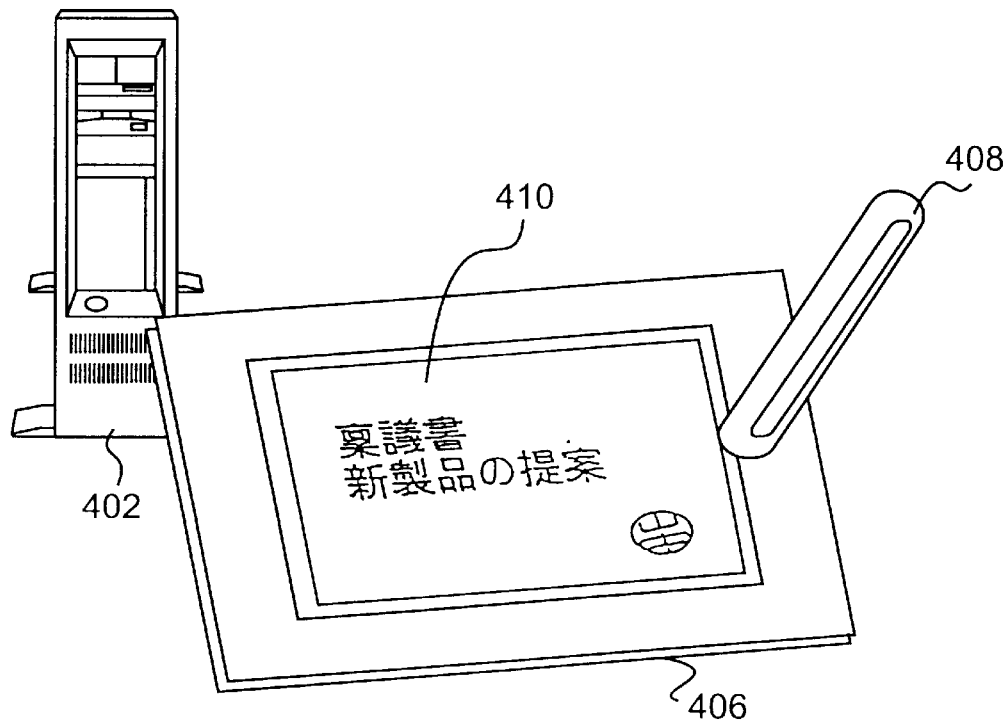
FIG. 5 shows a hardware configuration configuring the affixed electronic seal security system with a personal computer, a tablet equipped with a flat display device arranged in a layer, and an electronic seal stamp.

FIG. 4 is an illustration of a hardware configuration comprising the security system for affixed electronic seal in the present invention with a personal computer 402, a CRT device 404, a tablet 406, and an electronic seal stamp 408, and FIG. 5 is an illustration of a hardware configuration comprising the affixed electronic seal security system in the present invention with a personal computer 402, a tablet 406 with a layered flat display device 410 (e.g. liquid crystal display device) and an electronic seal stamp 408.

Figure 6:
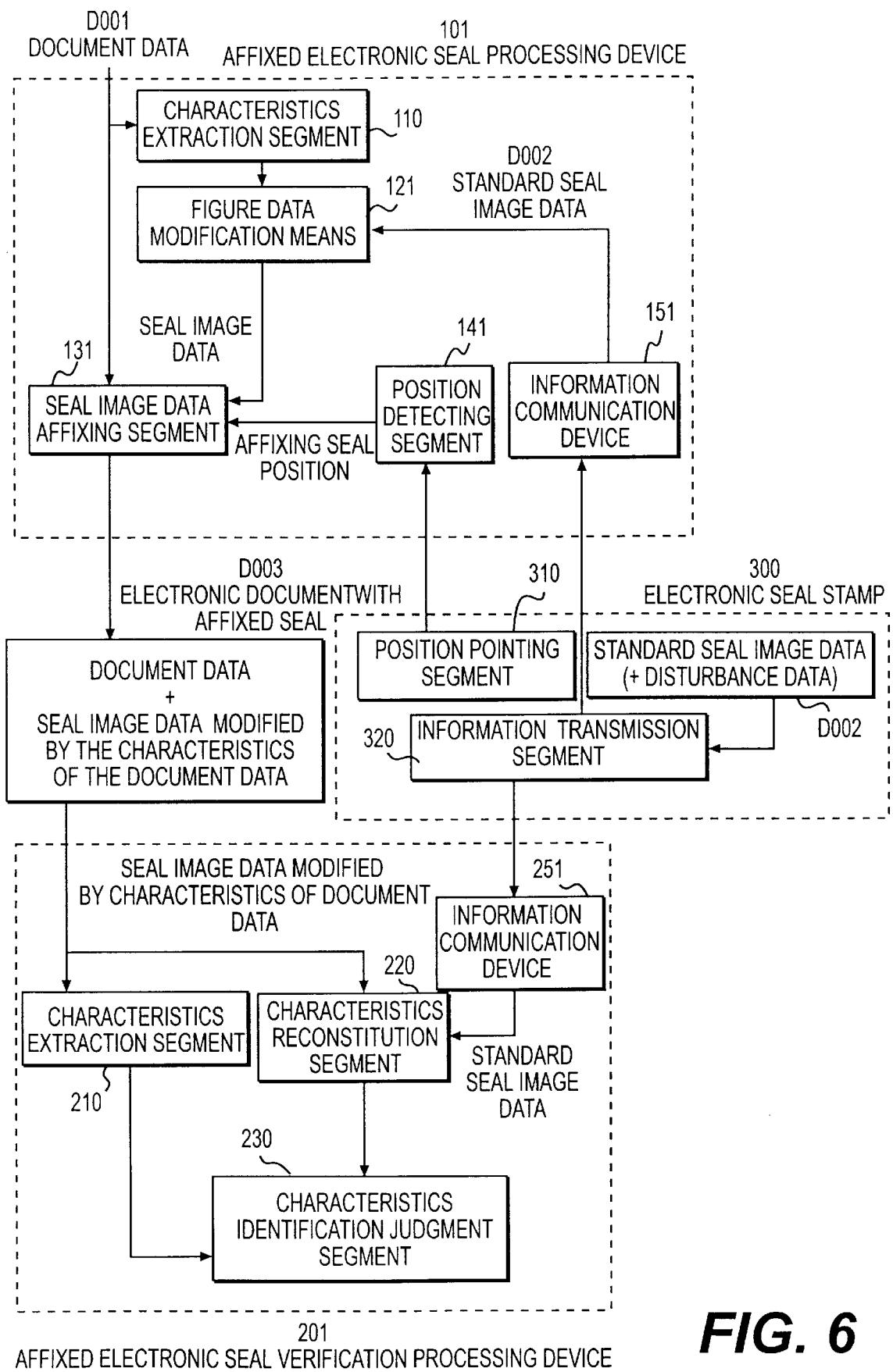
FIG. 6 is a block diagram of an affixed electronic seal security system, possessing a simple security function by having a standard seal image within a housing of an electronic seal stamp.
Figure 7:
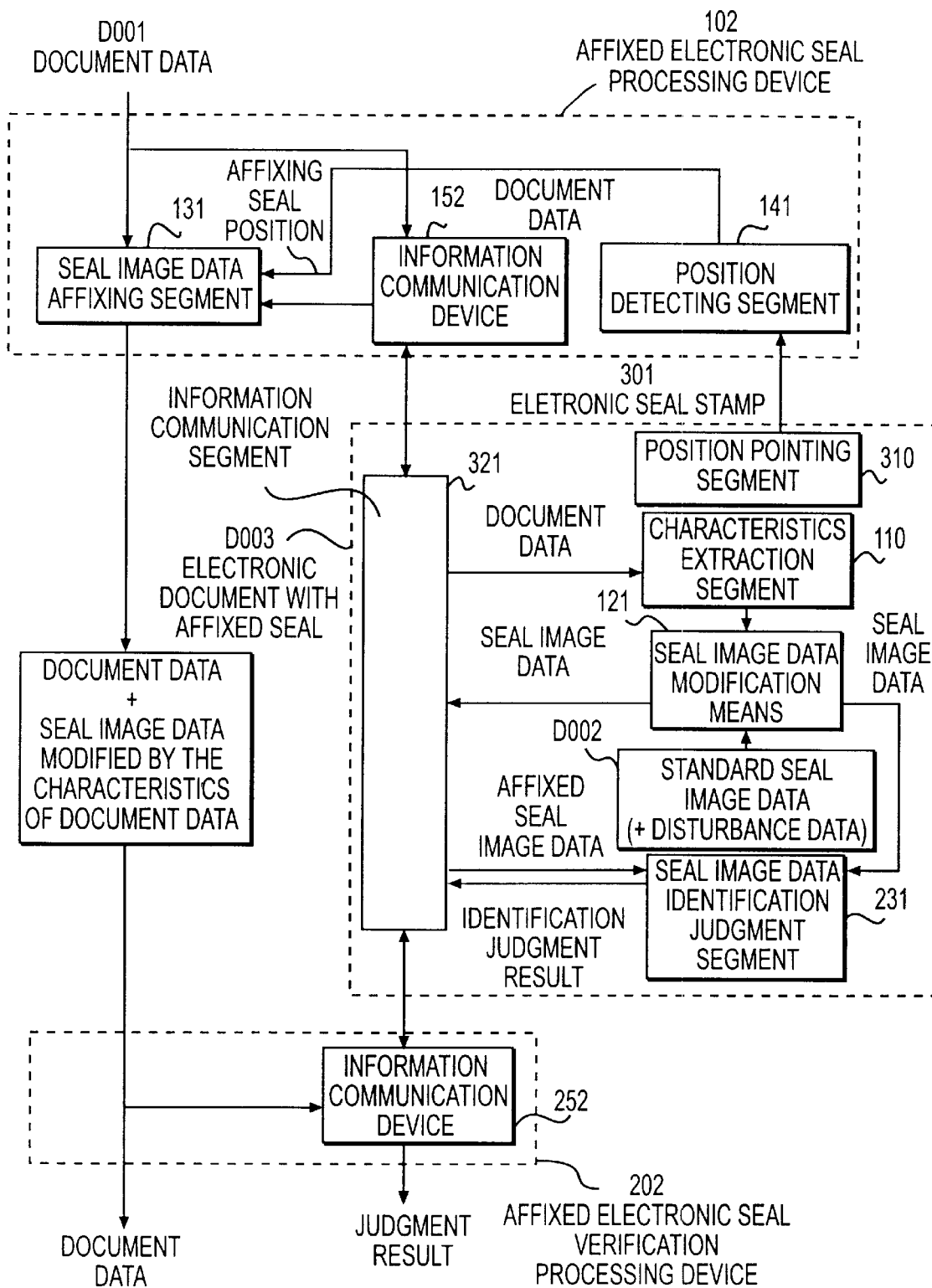
FIG. 7 is a block diagram of an affixed electronic seal security system which achieves a high degree security system by processing a seal image data modification, seal image data identification judgment, etc., inside an electronic seal stamp.
Figure 8:
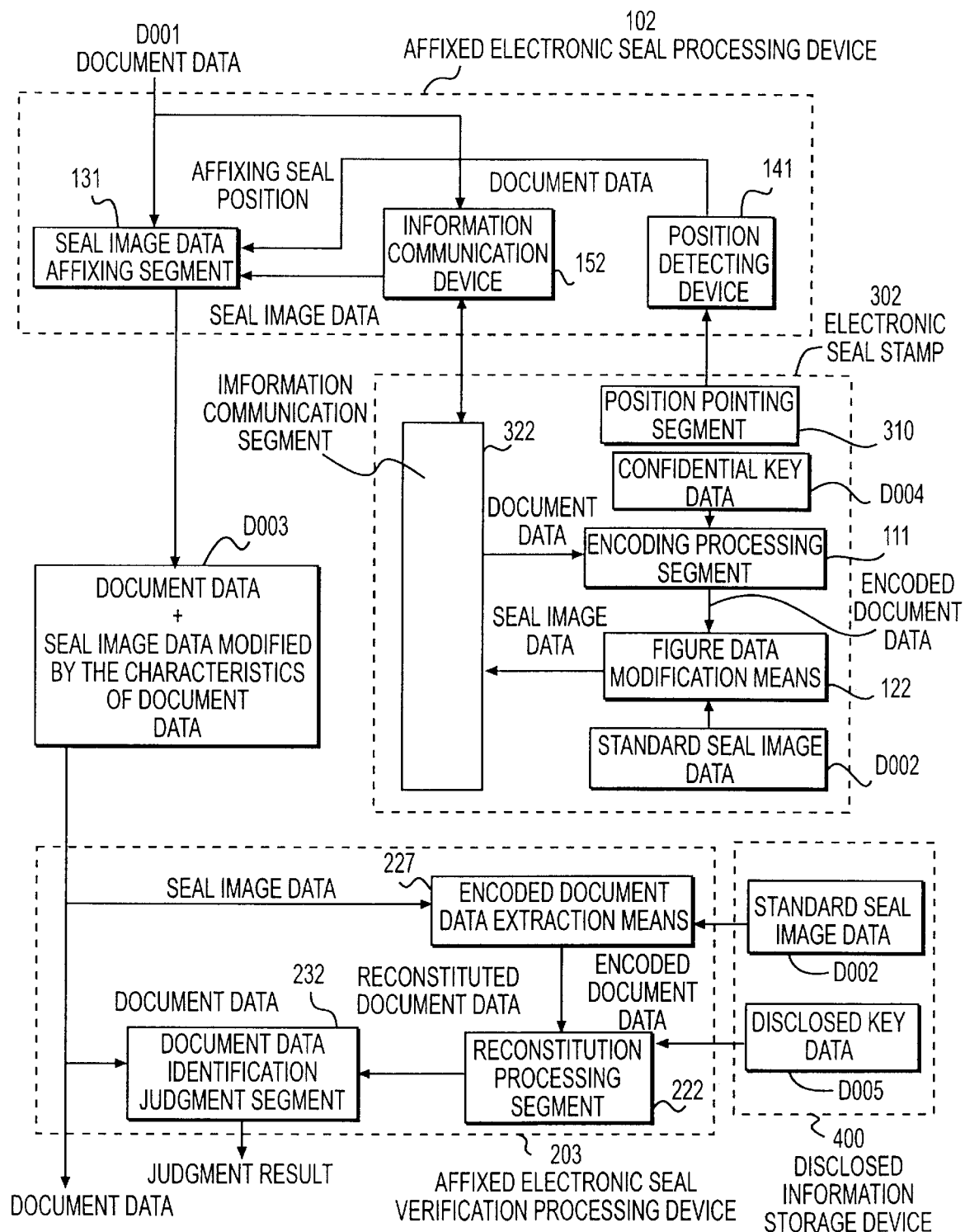
FIG. 8 is a block diagram of an affixed electronic seal security system which achieves an even higher security function by making a seal image data modification in an electronic seal stamp in accordance with an encode processing of a document data based on a confidential key data.

Possible hardware configurations for the affixed electronic seal security system are shown from FIG. 6 to FIG. 8. A common characteristics of the system from FIG. 6 to FIG. 8 is that a device called electronic seal stamp (a device which can also function as a position pointing device of a tablet) possesses a standard seal image data (which is a standard figure data mentioned already, and may be called the standard seal image data if the drawing data is a seal image data of a seal stamp), and the electronic seal stamp operates not only as a position pointing device for a tablet, but also as an information transmitter.

There are several Japanese patent applications filed by Wacom Co. for coordinate input devices wherein a position pointing device possesses functions such as holding information inside, pointing a position for a tablet, and also transmitting the holding information. For instance, there are Japanese patent laid open H3-189716 (Japanese patent application No. H1-327276. "Position Detecting Apparatus and Position Pointing Device Thereof"; Japanese Patent Laid Open No. H7-200137 (Japanese Patent Application No. H5-335802) "Position Detecting Apparatus and Position Pointing Device Thereof"; Japanese Patent Laid Open No. H8-16311 (Japanese Patent Application No. H6-148183) "Computer System." The disclosures of these three applications are hereby incorporated by reference.

It is made possible to configure a security system illustrated in FIGS. 6 to 8 with the art disclosed in these three patent applications. The tablet illustrated in FIGS. 4 and 5 correspond to a device expressed as a tablet or a position detecting apparatus in these 3 applications.

The electronic seal stamp illustrated in FIGS. 4 and 5 corresponds to a device expressed as a position pointing device in the above three applications. A first characteristic of the electronic seal stamp in FIGS. 6 to 8 is that the electronic seal stamp is to keep a standard figure data within its housing in order to solve a security problem for the standard figure data. The electronic seal stamps illustrated in FIGS. 4 and 5 are not connected to tablets by any kind of cables, comprised of independent housings.

Normally, a personal computer, a CRT, a tablet in FIG. 4, and a personal computer and a tablet having a layered flat surface display device, are connected by cables.

In a configuration example illustrated in FIG. 4, a location for a seal to be affixed is on a tablet, but a location for the seal to be displayed is on a CRT. In a configuration example illustrated in FIG. 5, a location for a seal to be affixed and a location for the seal image to be displayed are the same so that the affixing of a seal can be done with a similar feeling to that of working on a paper document.

As a merit of using a position detecting apparatus, it should be noticed that a position for affixing a seal sometimes has a special meaning. A paper document used in Japan is sometimes allocated with locations for seals to be affixed in accordance with the approving person's position in a company. In such a case, the location for the affixed seal can be set for automatic allocation without instructing the location.

If, for example, a superior is absent and a seal needs to be affixed in his place, then the seal needs to be affixed in a different location. In such a case, there is a merit in giving a direct instruction for a location to affix the seal.

In case of affixing a correction seal, the seal needs to be affixed in a particular location near where the correction is made, thereby having a meaning for the affixed location. This is also a merit for employing a position detecting apparatus.

FIG. 6 is a block diagram of the security system for affixed electronic seals which actualized a simple security function by keeping the standard seal image data within a housing of the electronic seal stamp.

In an embodiment illustrated in FIG. 6, the position detecting segment 141 and the information communication device 151 are installed within the affixed electronic seal processing device 101, which are different feature from the affixed electronic seal or signature processing device 100 illustrated in FIG. 1.

The position detecting segment 141 is mainly configured in a device which includes a sensor on a flat surface within a coordinate position detecting apparatus which is sometimes called a digitizer tablet.

A coordinate position detecting apparatus is an input device to input a coordinate (XY coordinate) to a computer by moving a position pointing device, which is generally an electronic pen or a cursor device (a pack shaped position pointing device), placed within a coordinate detectable area of a flat surface.

The electronic seal stamp 300 is a position pointing device equipped with a position pointing segment 310 to point a position within a coordinate position detectable area of the coordinate position detecting apparatus, keeping a standard seal image data inside, and also equipped with an information communication segment 320.

An embodiment illustrated in FIG. 7 shows that it is relatively easy to configure the electronic seal stamp 300 with a CPU inside and equipped with a battery, and physically separated from the affixed electronic seal device 101 without being connected by a cable.

By combining the present invention and the art illustrated in the above three applications, it is possible to configure the electronic seal stamp 300 without installing a CPU or a battery inside the housing of the electronic seal stamp 300.

As a brief summary of the above mentioned art in the three applications, in Japanese Patent Laid Open No. 3-189716, a cordless tablet having an electromagnetic connection between a position pointing device equipped with a resonance circuit and a tablet is disclosed. The position pointing device receives a timing information from the tablet, and returns code information to the tablet as a change in phase angle or frequency. The tablet detects it and gains the code information of the position pointing device.

A basic configuration of the electronic seal stamp illustrated in FIG. 6 can be accomplished by installing a nonvolatile memory in the housing of the position pointing device, and letting keep the standard seal image data (+ a disturbance data).

Then, in Japanese Patent Laid Open No. 7-200137, a position detecting apparatus and a position pointing device thereof wherein a tablet transmits various orders to a cordless position pointing device while the operation is controllable is disclosed.

The application also proposes a position detecting apparatus and a position pointing device thereof, enabling pointing information to be transmitted from the position pointing device to the tablet only when it is necessary.

The application further proposed a position detecting apparatus and a position pointing device therefor, in case plural information are stored in the position pointing device, enabling only a necessary information to be transmitted from the position pointing device to a tablet.

Therefore, the electronic seal stamp 300 is able to transfer only a necessary data at a necessary timing to the affixed electronic seal processing device 101.

In the Japanese Patent Laid Open No. 8-16311, the application proposes a position pointing device capable of recognizing a software running on a computer side, capable of starting the software program if necessary, and equipped with function to input selectively to only specific software programs.

According to this art, when the electronic seal stamp 300 approaches the position detecting section 141 and the information communication device 151 which comprise the affixed electronic seal processing device 101, even while a computer which is comprised of the affixed electronic seal processing device 101 is executing another application (e.g. text inputting processing for a word processing program), automatically initiate a software for the affixed electronic seal processing and causes the computer to function as the affixed electronic seal processing device 101.

Also, it is possible to refuse to transfer the standard seal image data (+ disturbance data) for a software other than the affixed electronic seal processing software, so that it is convenient to keep the confidentiality for this type of the data from a security viewpoint.

There is another point where the embodiment illustrated in FIG. 6 is different from the basic configuration illustrated in FIG. 1. It is referring to what an arrow from the information transmission segment 320 in the electronic seal stamp 300 to the information communication device 251 in the verification processing device 201 of an affixed electronic seal means.

Between the information communication device 251 and the information transmission segment 320, an information exchange is possible through, for example, an electromagnetic connection. In other words, it can be configured by the art disclosed in the aforementioned three applications. In this case the function of position pointing and position detecting can be omitted, so that the electromagnetic connection is made between the resonance circuit in the information transmitting segment 320 and the antenna (loop coil) in the information communication device 251, enabling information to be exchanged by loading the code information with a timing which is in the information of the waveform variance.

Also, the verification processing device 201 of the affixed electronic seal is usually configured by a general personal computer, it is possible, by using the above mentioned art, to configure the verification processing software or the reference software to the standard seal image data for the purpose will operate only when the electronic seal stamp 300 is approached to the information communication device 251 in order to make it possible that only when a software is the verification processing software the standard seal image data (+ disturbance data) D002 is referred to.

It is desirable from the security viewpoint that the verification software of the verification processing device 201 for the affixed electronic seal is used only as a reference to reconstitute the characteristics at the characteristics reconstitution segment 220 for the standard seal image data (+ disturbance data) D002 referred via information communication device 251. If the standard seal image (+ disturbance data) D002 is remained in any form in the memory device on the verification processing device 201 for the affixed electronic seal, there is always a possibility that an operator of the computer comprising said device may tamper a document by using other person's seal image.

From such a security viewpoint, only one electronic seal stamp 300 in FIG. 6 should be possessed by a person who will execute the affixing process and kept under a tight security. Having more than one electronic seal stamp is not desirable.

This point is also different from the basic configuration illustrated in FIG. 1 wherein the standard seal image data (+ disturbance data) has to be kept in two locations; in a computer of the affixing person, and in the network server. The electronic seal stamp illustrated in FIG. 6 is only one, and for the verification process, the affixing person himself needs to go to the verification processing device 201 for affixing the electronic seal.

To begin with, the affixed electronic seal in the present invention is different from a prior example PGP signature illustrated in FIG. 11(B), that this invention enables a visual identification for the authenticity of a document to a relatively high degree, and requires a thorough verification only when a doubt is raised, so that an example of the security system using an affixed electronic seal illustrated in FIG. 6 may be considered to have actualized a simple security system for an electronic document.

One more characteristic of the embodiment illustrated in FIG. 6 is that the seal image data affixing seal segment 131 in the affixed electronic seal processing device 101 can receive a modified seal image data from the seal image data modification means 121 and also be able to place the seal image data at a specific location in the document data D001 (a location the affixing person wants to place) upon receiving the information for the affixing position from the position detecting segment 141. In this way, how the electronic document D003 is created with an affixed seal is different from the basic configuration illustrated in FIG. 1. This is why the electronic seal stamp 300 is also a position pointing device.

A limitation of the security system illustrated in FIG. 6 is that the standard seal image data (+ disturbance data) D002 is, though it is temporary, handed to the electronic seal affixing device 101 or to the verification processing device 201 for the affixed electronic seal. This kind of system is operated among a group of people. The possibility is not zero that one person in the group may steal private information to abuse it. For example, the person may rewrite a software to access to the standard seal image data (+ disturbance data), which should be a private data of another person, and gain it unlawfully.

FIG. 7 is a block diagram of the security system for the affixed electronic seal which actualized a high security function by modifying the seal image data inside the electronic seal stamp, and processing the identification judgment for the seal image data.

FIG. 7 illustrates an embodiment in which the electronic seal stamp 301 operates as an independent computer by being equipped with a CPU and a battery. The characteristics extraction segment 110 and the seal image data modification means 121, according to the embodiment illustrated in FIG. 6, are installed within the affixed electronic seal processing device 101, but according to an embodiment in FIG. 7 they are installed inside the housing of the electronic seal stamp 300. The seal image data identification judgment segment 231 illustrated in FIG. 7 corresponds to the characteristics identification judgment segment 230 in the verification processing device 201 for the affixed electronic seal in the embodiment illustrated in FIG. 6.

The embodiment illustrated in FIG. 7 will be described in accordance with a processing flow. Affixed electronic seal processing device 102 is a general computer which is configured with a software necessary for the electronic document security, whereby a digitizer tablet (coordinate input device) as an input device is connected.

Said tablet uses the electronic seal stamp 301 as a position pointing device, having an information communication function with the electronic seal stamp 301. The electronic seal stamp 301 and a digitizer tablet which has the affixed electronic seal processing device 102 can exchange information by an electromagnetic union for example, without a cable connection.

If the electronic seal stamp 301 approaches the digitizer tablet of the affixed electronic seal processing device 102 while the document data D001 is being read by the affixed electronic seal processing device 102, the affixed electronic seal processing device 102 delivers the document data D001 to the electronic seal stamp 301 via the information communication device 152.

The information communication segment 321 of the electronic seal stamp 301, upon receiving the document data D001, delivers the data to the characteristics extraction segment 110 in the electronic seal stamp 301 in order to extract the characteristics.

The characteristics extraction segment 110 in the electronic seal stamp illustrated in FIG. 7 executes the same processing as in FIG. 1, the characteristics extraction segment 110 in the affixed electronic seal, or the electronic signature processing device 101, and the characteristics extraction segment 110 in the affixed electronic seal processing device 101 illustrated in FIG. 6, and extracts the characteristics of the document data D001. The extracted characteristics are delivered to the electronic seal stamp 301 or to the seal image data modification means 121 illustrated in FIG. 7.

The seal image data modification means 121 in the electronic seal stamp 301 illustrated in FIG. 7 adds a modification to the standard seal image data (+ disturbance data) D002 in accordance with the characteristics, and returns the post modified seal image data to the information communication segment 321.

It is preferred for the embodiment in FIG. 7 that though the standard seal image data (+ disturbance data) D002 is held by a memory means in the electronic seal stamp 301, accessible means to the data is only the seal image data modification means 121, and furthermore, the seal image data modification means will not output D002 itself, but instead returns only the modified seal image data to the information communication segment 321.

The embodiment in FIG. 7 aims to strengthen the security level by preventing the data of D002 from going out in its unmodified form.

The processing content the seal image data modification means 121 in the electronic seal stamp 301 illustrated in FIG. 7 executes is the same as the processing content executed in FIG. 1 by the figure data modification means 120 in the affixed electronic seal or electronic signature processing device 100, or in FIG. 6 by the seal image data modification means 121 in the affixed electronic seal processing device 101.

The information communication segment 321 of the electronic seal stamp 301, upon receiving the modified seal image data, returns it to the information communication device 152 in the affixed electronic seal processing device 102. The information communication device 152 in the affixed electronic seal processing device 102, upon receiving the seal image data, transmits it to the seal image affixing segment 131 in the affixed electronic seal processing device 102.

On the other hand, the position detecting segment 141 in the affixed electronic seal processing device 102 detects which position on the tablet the electronic seal stamp 301 is pointing, and delivers the coordinate data as the position for affixing the seal to the seal image data affixing segment 131.

The seal image data affixing segment 131 executes a process of affixing the seal image data gained from the information communication device 152 on the affixing position sent from the position detecting segment 141 in the document data D001 which is an electronic document data, and generates an electronic document D003 with the affixed seal.

The electronic document D003 with the affixed seal is a combination of the document data and the seal image data modified by the characteristics of the document data, and by this generation of the data, the affixed seal processing by the affixed electronic seal processing device 102 is completed.

Next, the verification process of the affixed electronic seal illustrated in FIG. 7 will be described. As it has been previously described, the modified seal image data are a crest or a badge, etc, which identifies the affixing person himself, having a special feature in the external appearance of the drawings, and the modified seal image still looks like almost the same as the standard seal image, so that it does not have to be verified electronically each time when a document with an affixed seal is transmitted through an intra company LAN (local area network).

When a final decision needs to be made, the need for processing verification by the affixed electronic seal verification process device 202 will be raised. This verification process can be done by bringing the specific electronic seal stamp 301 used for affixing the seal to near the verification process device 202 for the affixed electronic seal.

When a need for verification arises, the electronic document D003 with the affixed seal is transmitted to the information communication segment 321 in the electronic seal stamp 301 by the information communication device 252 in the verification processing device for the affixed electronic seal.

The information communication segment 321 separates the electronic document D003 into the document data and the seal image data, thereby sending the document data to the characteristics extraction segment 110 in the electronic seal stamp 301, and the seal image data to the seal image data identification judgment segment 231 in the electronic seal stamp. The separation processing of the electronic document D003 into the document data and the seal image data, however, is preferred to be conducted by the verification processing device 202 for the affixed electronic seal (especially when the processing is complex), to avoid a security problem.

The document data sent from the information communication segment 321 in the electronic seal stamp to the characteristics extraction segment 110 in the electronic seal stamp 301 is supposed to be identical to the original document data D001. The characteristics extraction segment 110 in the electronic seal stamp again extracts the characteristics from this document data.

The meaning of "again" in the previous statement is that the same processing conducted for the affixed seal processing once is conducted toward the document data sent from the information communication device 252 in the verification processing device 202 for the affixed seal.

The extracted characteristics are sent to the seal image data modification means 121 in the electronic seal stamp 301. The seal image data modification means 121 gets the standard seal image data (+ disturbance data) and modifies it in accordance with the characteristics.

The modified seal image data is sent to the seal image data identification judgment segment 231 in the electronic seal stamp 301 from the seal image modification means 121 in the electronic seal stamp 301. The seal image data identification judgment segment 231 in the electronic seal stamp compares the seal image data received from the information communication segment 321 to the seal image data received from the seal image data modification means 121 and judges if they are identical or not.

The seal image data identification judgment segment 231 in the electronic seal stamp 301 sends a judgment result to the information communication segment 321. When the two seal image data are identical, the judgment result proves the authenticity of the document data D003; when the two data are not identical, the judgment result proves that the document data D003 is not authentic.

The information communication segment 321 in the electronic seal stamp 301 sends the judgment results to the information communication device 252 in the verification processing device 202 for the affixed electronic seal, and the verification processing device 202 for the affixed electronic seal outputs the results. Thus, the verification processing for the electronic document D003 with the affixed seal is completed.

A reason the embodiment in FIG. 7 judges the identification of the seal image data without judging the identification of the characteristics in the verification processing is that the electronic seal stamp in itself has the characteristics extraction segment 110 already, so that it is useless to install the characteristics reconstitution segment 220 like in the cases of FIGS. 1 and 6.

On the other hand, embodiments in FIGS. 1 and 6 judge the identification of the characteristics instead of the seal image data for a security reason.

To be more specific, if the processing in the affixed electronic seal or electronic signature processing device 100 in FIG. 1 or the characteristics extraction segment 110 and the figure data modification means 120 or the seal image data modification means 121 in the affixed electronic seal processing device 101 is conducted in the affixed electronic seal or electronic signature verification processing device 200 in FIG. 1 or the verification processing device 201 for the affixed electronic seal in FIG. 6, it becomes possible for a person who is conducting the processing at the side of the verification processing device to conduct the same processing done by the affixed seal processing device, so that the operator may pretend to be another person to conduct an unlawful processing of the affixed seal, which creates a security problem.

To avoid the security problem, embodiments illustrated in FIGS. 1 and 6 are given the function of the characteristics reconstruction only to the verification processing device side, which is a reversed function of the figure data modification and the seal image data modification.

The embodiment in FIG. 7 on the other hand presumes that the affixing person alone possesses the only one electronic seal stamp 301 to avoid having this kind of security problem to enable the seal image data identification judgment to be conducted.

FIG. 8 is a block diagram of the security system for the affixed electronic seal which achieves an even higher level security than previously mentioned embodiments by applying an encode processing to the document data for the seal image modification in the electronic seal stamp based on the confidential key data.

The document data encode processing is based on the confidential key data means, which is based on the disclosed key encoding method previously mentioned. A processing to encode (disturb) the document data is based on the confidential key data possessed and kept by the person who affixes the electronic seal (a signatory).

Here is an enumeration of different points of the embodiment illustrated in FIG. 8 from the embodiment illustrated in FIG. 7. The confidential key data D004 is kept in the electronic seal stamp 302. The encode processing segment 111 is installed in place of the characteristics extraction segment 110 in FIG. 7.

Instead of conducting the identification judgment for the verification processing in the electronic seal stamp 302, the identification judgment at the document data identification judgment segment 232 is conducted in the affixed electronic seal verification processing device 203. The disclosed information storing device 400 stores the standard seal image data D202 and the disclosed key data D005. In the affixed electronic seal verification processing device 203, extraction means 221 and the reconstruction processing segment 222 for the encoded document data are installed.

The embodiment illustrated in FIG. 8 shall be described in accordance with the flow of processing. The configuration of the affixed electronic seal processing device 102 is the same as the embodiment in FIG. 7, whereby the same processing is executed.

While the affixed electronic seal processing device 102 is handling the document data D001, if the position pointing segment 310 of the electronic seal stamp 302 is brought near the position detecting segment 141 of the affixed electronic seal verification device 102, and the information communication segment 322 of the electronic seal stamp 302 is approached to the information processing device 152 of the affixed electronic seal processing device 102, then the affixed electronic seal processing device 102 sends the document data D001 to the information communication segment 322 of the electronic seal stamp 302 via the information communication device 152.

The document data D001 sent to the information communication segment 322 of the electronic seal stamp is then sent to the encoding process segment 111 from the information communication segment 322. The encoding process segment 111 gets the confidential key data D004 stored in the electronic seal stamp 302 and encodes the document data D001 by the confidential key data D004. The encoded document data is sent from the encoding process segment 111 to the seal image data modification means 122.

The seal image data modification means 122 gets the standard seal image data D002 which is pre-stored in the electronic seal stamp 302, and adds a modification such as a transformation or a revision to the standard seal image data D002 by the encoded document data (reflecting the characteristics of the encoded document data) which is the output of the encoding process device segment 111. The modification processing becomes the same kind of processing as the one conducted through the drawing data modification means 120 illustrated by the embodiment in FIG. 1, and the one by the seal image modification means 121 illustrated by the embodiment either in FIG. 6 or FIG. 7.

The modified seal image data is sent to the information communication segment 322. The information communication segment 322 sends the modified seal image data to the information communication device 152 in the affixed electronic seal processing device 102. The information communication device 152 in the affixed electronic seal processing device 102 sends the modified seal image data to the seal image affixing segment 131 in the affixed electronic seal processing device 102.

On the other hand, the position pointing segment 310 in the electronic seal stamp 302 informs the position where the electronic seal stamp 302 is placed to the position detecting segment 141 in the affixed electronic seal processing device 102. The position detecting segment 141 in the affixed electronic seal processing device 102 detects the position pointed by the position pointing segment 310 in the electronic seal stamp 302, and sends the positional information of the affixed seal (coordinate information) to the seal image data affixing segment 131 in the affixed electronic seal processing device 102.

The seal image data affixing segment 131 in the affixed electronic seal processing device 102 outputs the electronic document D003 with the affixed seal by adding the seal image data gained from the information communication device 152 to a location on the document data D001 specified by the affixing position information gained from the position detecting segment 141. In this way the electronic document with the affixed seal is generated.

When a need for a verification processing of an electronic document with an affixed seal arises, the affixed electronic seal verification processing device 203 executes the verification processing. The embodiment in FIG. 7 shows that the identification judgment is executed in the electronic seal stamp 301, while the embodiment in FIG. 8 shows that the identification judgment is executed in the affixed electronic seal verification processing device 203, which is a different point between the two embodiments.

Another different point of the embodiment in FIG. 8 is that the disclosed information storage device 400 is installed, and the affixed electronic seal verification processing device 203 executes the verification processing by using the standard seal image data D002 which is stored in said device 400 and the disclosed key data D005.

The reason in the embodiment the standard seal image data D002 can be disclosed is that even a person with malice may not falsely assume the official owner of the electronic seal stamp with the disclosed information alone, because the affixing the seal is possible only bythe combination of the standard seal image data D002 and the confidential key data D004.

Now the verification processing flow for an electronic document with an affixed seal shall be described in reference to FIG. 8. First, the affixed electronic seal verification processing device 203 separates the electronic document with the affixed seal D003 into the document data and the seal image data. This separation usually is to simply separate what have been put together. The separated document data should be identical to the original plain sentenced document data D001.

This document data is sent to the document data identification judgment segment 232. On the other hand, the separated seal image data is sent to the encoded document data extraction means 221. The encoded document data extraction means 221, by referring to the standard seal image data D002 which is stored in the disclosed information storage device 400, extracts the encoded document data which is the base for the seal image modification. This extraction processing is a reverse conversion processing from the modification processing executed by the seal image modification means 122 in the electronic seal stamp 302.

The output of the encoded document data extraction means 221, i.e. the encoded document data, is sent to the reconstitution processing segment 222. The reconstitution processing segment 222 executes the reconstitution processing of the encoded document data, using the disclosed key data D005 which is stored in the disclosed information storage device 400. The output, i.e. the reconstituted document data, is sent to the document data identification judgment segment 232.

The document data identification judgment segment 232 compares the separated document data from the affixed seal electronic document D003 with the reconstructed document data by the reconstruction processing segment 222, and judges if they are identical or not. If both are identical, then the judgment result of accepting the authenticity of the affixed seal in the affixed seal electronic document D003 is output. In case the two data are not identical, then the judgment result of denying the authenticity of the affixed seal in the affixed seal electronic document D003 is output.

According to the embodiment in FIG. 8, the verification processing is conducted based on the standard seal image data D002 which is stored in the disclosed information storage device 400, and the disclosed key data D005. This point differs from the embodiment in FIG. 7, wherein the identification judgment is conducted in the electronic seal stamp 301.

As a result, the verification processing according to the embodiment in FIG. 8 can be said to be more friendly than that of FIG. 7. The embodiment in FIG. 7 presupposes there is only one electronic seal stamp 301 physically, so that, practically speaking, the verification processing may not be conducted too often. On the other hand, the embodiment according to FIG. 8 allows the verification processing more easily conducted for the disclosed information storage device to be accessible to anyone.

Figure 9:
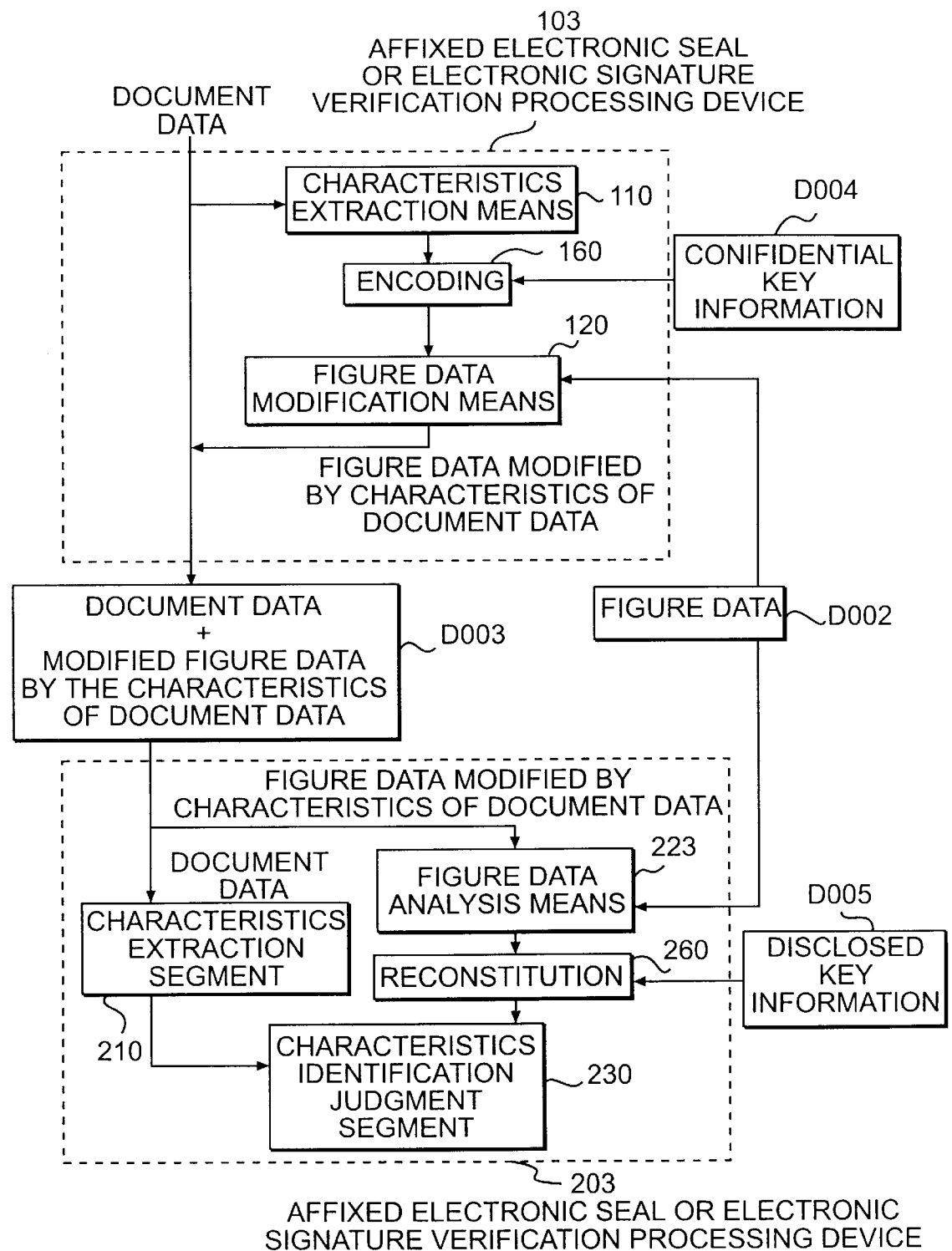
FIG. 9 is a block diagram of an embodiment which adds an encoding by the confidential key and decoding by the disclosed key to the basic configuration in accordance with the present invention.

FIG. 9 is a block diagram of the embodiment, adding to the basic configuration of the present invention with the encoding by the confidential key, and with the reconstitution by the disclosed key.

The embodiment illustrated in FIG. 9 has two different points from the basic configuration illustrated in FIG. 1. First, in the affixed electronic seal or electronic signature processing device 103, after extracting the characteristics of a document data instead of executing the figure data modification processing based on the characteristics the encoding processing means 160 is installed to execute encoding process by the confidential key information D004 and modify the figure data according to the result of the encoding process.

Second point is, in the affixed electronic seal or electronic signature processing device 203, in order to reproduce the characteristics it takes two processing steps; the figure data analysis processing and the reconstitution processing by the disclosed key information.

In the basic configuration illustrated in FIG. 1, the applicant of the present invention proposed the concept of the affixed electronic seal or the electronic signature with the use of the figure data which is to replace the conventional electronic signature, and the same applicant further proposes an embodiment illustrated in FIG. 9 for more enhanced security system by incorporating the encoding and decoding by the confidential key and disclosed key.

Comparing the embodiment illustrated in FIG. 9 to the embodiments shown in FIGS. 6 through 8, the most significant difference is that the position pointing segment and the position detecting segment are removed.

For the embodiments shown in FIGS. 6 through 8, the effectiveness of the digitizer tablet is pointed out, while the embodiment in FIG. 9 points out the effectiveness of encoding and decoding by using the confidential key and disclosed key even in case of not adding the factor of position detecting to the basic configuration illustrated in FIG. 1.

Common features between the embodiments shown in FIG. 9 and FIG. 1 are assigned with the same reference numbers. Common features are already described so that the explanation is omitted for FIG. 9.

Figure 10:
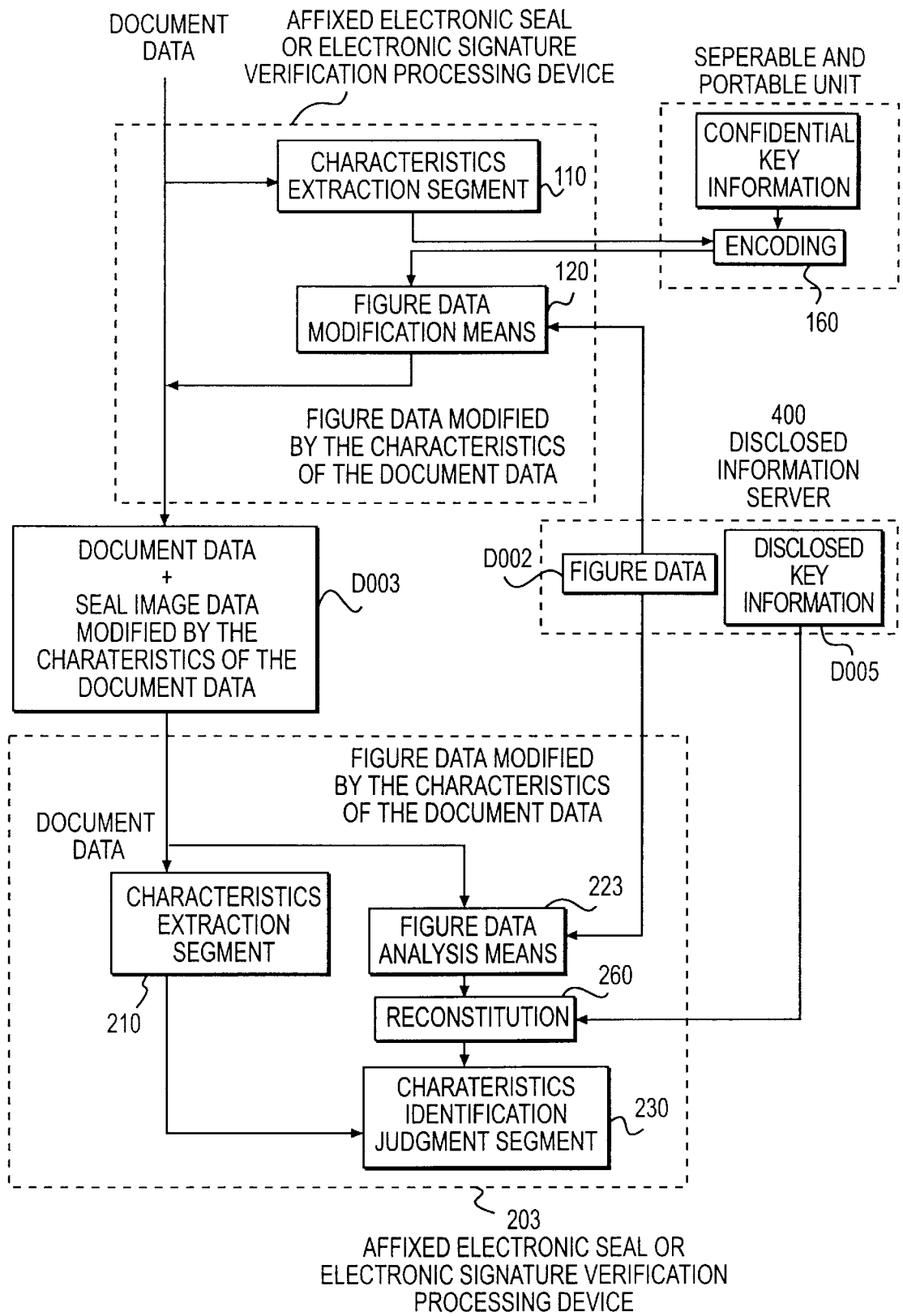
FIG. 10 is a block diagram of an embodiment thereby executes the encode processing by the confidential key in a separable unit.

FIG. 10 is a block diagram showing an embodiment executing an encoding processing by a confidential key at a separable (independent) unit. There are two points which are different from the embodiment shown in FIG. 9.

The first point is that the encode processing segment 160 is separated from the affixed electronic seal or electronic signature processing device 104 and installed in the portable unit 500, having stored the confidential key information D004 inside the unit.

The second point is that the figure data D002 and the disclosed key information D005 are stored in the disclosed information server 400.

By separating the confidential key information D004 and storing it in the portable unit 500, the risk of said information getting stolen by other person will decrease, thereby increase the security. In other words, the confidential key information in its raw form will not go out of said unit according to the embodiment illustrated in FIG. 10. A manager of the confidential key information may carry this unit with him to avoid a possibility of the unit being used by some other person.

The exchange of information between the affixed electronic seal or electronic signature processing device 104 and the separable and portable unit 500 is like the same manner as shown in FIGS. 7 and 8 wherein the exchange of information between the affixed electronic seal processing device 102 and the electronic seal stamps 301 and 302 is carried out by, for example, an electromagnetic union without a physical connection.

A separable and portable unit 500 can be configured as something like an IC card. The embodiment according to FIG. 10 executes the encode processing within said unit, which demands the unit to be equipped with a necessary CPU.

By storing the figure data D002 and the disclosed key information D005 in the disclosed information server 400, the security system of this invention can be applied well in a network system.

Through this invention of affixing the electronic seal or electronic signature, a system approves a document electronically as if in a similar manner of approving a paper document by affixing a seal or signature. This will contribute to efficiency in OA (office automation).

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An electronic document security system, comprising:
   means for storing an electronic document;
   means for storing a symbolic figure externally and separately from the electronic document;
   means for extracting a predetermined characteristic of the document;
   means for modifying the symbolic figure in accordance with the extracted characteristic and providing a modified symbolic figure;
   means for electronically transferring the electronic document and the modified symbolic figure; and
   means for separately transferring the symbolic figure.

2. The electronic document security system as claimed in claim 1, further comprising:
   means for receiving the transferred document;
   means for extracting the characteristic of the received document;
   means for providing a reconstituted characteristic of the modified symbolic figure and the symbolic figure; and
   means for determining whether the modified symbolic figure is modified in accordance with the extracted characteristic of the received document by comparing the characteristic of the received document and the reconstituted characteristic.

3. The document security system as claimed in claim 2, wherein the symbolic figure includes a signature.

4. The document security system as claimed in claim 2, wherein the symbolic figure includes a seal.

5. The document security system as claimed in claim 2, wherein the symbolic figure includes color data and wherein the means for modifying the symbolic figure modifies the color data.

6. The document security system as claimed in claim 2, wherein the symbolic figure includes position, size, or shape data and wherein the means for modifying the symbolic figure modifies the position, size or shape data.

7. The document security system as claimed in claim 2, further comprising a portable storage media for storing the symbolic figure.

8. The document security system as claimed in claim 2, wherein the means for extracting the predetermined characteristic includes means for assigning a numeric value to elements of the electronic document and means for totaling the numeric values to produce a checksum.

9. The document security system as claimed in claim 1, wherein the symbolic figure includes a signature.

10. The document security system as claimed in claim 1, wherein the symbolic figure includes a seal.

11. The document security system as claimed in claim 1, wherein the symbolic figure includes color data and wherein the means for modifying the symbolic figure modifies the color data.

12. The document security system as claimed in claim 1, wherein the symbolic figure includes position, size, or shape data and wherein the means for modifying the symbolic figure modifies the position, size, or shape data.

13. The document security system as claimed in claim 1, further comprising a portable storage media for storing the symbolic figure.

14. The document security system as claimed in claim 1, wherein the means for extracting the predetermined characteristic includes means for assigning a numeric value to elements of the electronic document and means for totaling the numeric values to produce a checksum.

15. The document security system as claimed in claim 1, wherein the means for storing the symbolic figure is a memory device.

16. An electronic document security system, comprising:
    means for storing an electronic document, the electronic document including a symbolic figure;
    means for extracting a predetermined characteristic of the document; and
    means for modifying the symbolic figure in accordance with the extracted characteristic, wherein the means for modifying the symbolic figure includes means for disturbance processing controlled by disturbance data.

17. The document security system as claimed in claim 16, further comprising a portable media for storing the disturbance data and the symbolic figure.

18. An electronic document security system, comprising:
    means for storing an electronic document, the electronic document including a symbolic figure;
    means for extracting a predetermined characteristic of the document; and
    means for modifying the symbolic figure in accordance with the extracted characteristic;
    means for electronically transferring the electronic document having a modified symbolic figure;
    means for receiving the transferred document;
    means for extracting the characteristic of the received document; and
    means for determining whether the modified symbolic figure is modified in accordance with the extracted characteristic of the received document, wherein the means for modifying the symbolic figure includes means for disturbance processing controlled by disturbance data.

19. An electronic document security system, comprising:
    means for storing an electronic document;
    means for storing a symbolic figure externally and separately from the electronic document;
    means for extracting a predetermined characteristic of the document;
    means for encoding the characteristic of the electronic document in accordance with a confidential key;
    means for modifying the symbolic figure in accordance with the encoded characteristic of the electronic document and providing a modified symbolic figure;
    means for electronically transferring the electronic document and the modified symbolic figure; and
    means for separately transferring the symbolic figure.

20. The document security system as claimed in claim 19, further comprising:
    means for receiving the transferred document;
    means for extracting the characteristic of the received document;

means for decoding the modified symbolic figure and provide a reconstituted characteristic of the modified symbolic figure and the symbolic figure; and means for determining whether the modified symbolic figure is modified in accordance with the confidential key by comparing the characteristic of the received document and the reconstituted characteristic.

21. The document security system as claimed in claim 20, wherein the symbolic figure includes a signature.

22. The document security system as claimed in claim 20, wherein the symbolic figure includes a seal.

23. The document security system as claimed in claim 20, wherein the symbolic figure includes color data and wherein the means for modifying the symbolic figure modifies the color data.

24. The document security system as claimed in claim 20, wherein the symbolic figure includes position, size, or shape data and wherein the means for modifying the symbolic figure modifies the position, size, or shape data.

25. The document security system as claimed in claim 20, further comprising a portable storage media for storing the symbolic figure and the confidential key.

26. The document security system as claimed in claim 19, wherein the symbolic figure includes a signature.

27. The document security system as claimed in claim 19, wherein the symbolic figure includes a seal.

28. The document security system as claimed in claim 19, wherein the symbolic figure includes color data and wherein the means for modifying the symbolic figure modifies the color data.

29. The document security system as claimed in claim 19, wherein the symbolic figure includes position, size, or shape data and wherein the means for modifying the symbolic figure modifies the position, size, or shape data.

30. The document security system as claimed in claim 19, further comprising a portable storage media for storing the symbolic figure and the confidential key.

31. The document security system as claimed in claim 19, wherein the means for storing the symbolic figure is a memory device.

32. An electronic document security system, comprising:
means for storing an electronic document, the electronic document including a symbolic figure;
means for encoding the electronic document in accordance with a confidential key; and
means for modifying the symbolic figure in accordance with the encoded electronic document, wherein the means for modifying the symbolic figure includes means for disturbance processing controlled by disturbance data.

33. An electronic document security system, comprising:
means for storing an electronic document, the electronic document including a symbolic figure;
means for encoding the electronic document in accordance with a confidential key;
means for modifying the symbolic figure in accordance with the encoded electronic document;
means for electronically transferring the electronic document having a modified symbolic figure;
means for receiving the transferred document;
means for decoding the received document; and
means for determining whether the modified symbolic figure is modified in accordance with the confidential key, wherein the means for modifying the symbolic figure includes means for disturbance processing controlled by disturbance data.

34. The document security system as claimed in claim 33, further comprising a portable media for storing the disturbance data, the symbolic figure, and the confidential key.

35. An electronic document security system, comprising:
means for storing an electronic document;
means for storing a symbolic figure separately from the electronic document;
means for encoding the electronic document in accordance with a confidential key and for extracting a predetermined characteristic from the encoded electronic document;
means for modifying the symbolic figure in accordance with the characteristic providing a modified symbolic figure; and
means for electrically transferring the electronic document and the modified symbolic figure;
means for separately transferring the symbolic figure.

36. The document security system as claimed in claim 35, further comprising:
means for receiving the transferred document;
means for extracting the characteristic of the received document;
means for providing a reconstituted characteristic from the symbolic figure and the symbolic figure; and
means for determining whether the modified symbolic figure is modified in accordance with the extracted characteristic of the received document by comparing the characteristic of the received document and the reconstituted characteristic.

37. The document security system as claimed in claim 36, wherein the symbolic figure includes a signature.

38. The document security system as claimed in claim 36, wherein the symbolic figure includes a seal.

39. The document security system as claimed in claim 36, wherein the symbolic figure includes color data and wherein the means for modifying the symbolic figure modifies the color data.

40. The document security system as claimed in claim 36, wherein the symbolic figure includes position, size, or shape data and wherein the means for modifying the symbolic figure modifies the position, or size, or shape data.

41. The document security system as claimed in claim 36, further comprising a portable storage media for storing the symbolic figure.

42. The document security system as claimed in claim 36, wherein the means for extracting the predetermined characteristic includes means for assigning a numeric value to elements of the electronic document and means for totaling the numeric values to produce a checksum.

43. The document security system as claimed in claim 35, wherein the means for storing the symbolic figure is a memory device.

44. An electronic document security system, comprising:
means for storing an electronic document, the electronic document including a symbolic figure;
means for encoding the electronic document in accordance with a confidential key and for extracting a predetermined characteristic from the encoded electronic document;
means for modifying the symbolic figure in accordance with the characteristic;
means for electronically transferring the electronic document having a modified symbolic figure;
means for receiving the transferred document;

means for extracting the characteristic of the received document; and means for determining whether the modified symbolic figure is modified in accordance with the extracted characteristic of the received document, wherein the means for modifying the symbolic figure includes means for disturbance processing controlled by disturbance data.

45. The document security system as claimed in claim 44, further comprising a portable media for storing the disturbance data and the symbolic figure.

46. In electronic document security system, a method for security coding and authenticating a document comprising the steps of:

storing and manipulating an electronic document;

storing a symbolic figure externally and separately from the electronic document;

encoding the electronic document in accordance with a confidential key and extracting a predetermined characteristic from the encoded electronic document;

modifying the symbolic figure in accordance with the characteristic;

electronically transferring the electronic document and a modified symbolic figure;

receiving the transferred document;

extracting a characteristic of the received document;

providing a reconstituted characteristic from the modified symbolic figure and the and the symbolic figure; and determining whether the modified symbolic figure is modified in accordance with the extracted characteristic of the received document by comparing the characteristic of the received document and the reconstituted characteristic.

47. The method as claimed in claim 46, further comprising the step of storing the confidential key and the symbolic figure in a portable media.

48. The method as claimed in claim 47, wherein the symbolic figure includes a signature.

49. The method as claimed in claim 47, wherein the symbolic figure includes a seal.

50. The method as claimed in claim 47, wherein the step of extracting the predetermined characteristic includes the sub-step of assigning a numeric value to elements of the electronic document and means for totaling the numeric values to achieve a checksum.

51. The method as claimed in claim 46, wherein the symbolic figure is stored in a memory device.

52. An electronic document security system, comprising:

means for storing an electronic document;

means for storing a symbolic figure externally and separately from the electronic document;

means for extracting a predetermined characteristic of the document;

means for modifying the symbolic figure in accordance with the extracted characteristic and providing a modified symbolic figure;

means for electronically transferring the electronic document and the modified symbolic figure;

means for receiving the transferred document;

means for extracting the characteristic of the received document;

means for providing a reconstituted characteristic form the modified symbolic figure and the symbolic figure; and means for determining whether the modified symbolic figure is modified in accordance with the extracted characteristic of the received document by comparing the characteristic of the received document and the reconstituted characteristic.

* * * * *